(12) United States Patent
Burke, III et al.

(10) Patent No.: US 6,591,560 B2
(45) Date of Patent: Jul. 15, 2003

(54) ELECTROSTATIC DISSIPATING FLOORING ARTICLE

(75) Inventors: William O. Burke, III, LaGrange, GA (US); Amy B. Streeton, LaGrange, GA (US); Robert C. Kerr, LaGrange, GA (US); William H. Stewart, Jr., Campobello, SC (US); Roy P. DeMott, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/802,824

(22) Filed: Mar. 9, 2001

(65) Prior Publication Data

US 2002/0178661 A1 Dec. 5, 2002

(51) Int. Cl.⁷ .......................... E04F 11/16; E04F 15/00
(52) U.S. Cl. ................. 52/177; 52/179; 5/420; 428/159; 428/161
(58) Field of Search .................. 52/177, 179, 180, 52/181, 660, 661; 29/900; 5/420, 693, DIG. 906, 698; 428/159, 161

(56) References Cited

U.S. PATENT DOCUMENTS

| | | | | |
|---|---|---|---|---|
| 2,280,631 A | * | 4/1942 | Coffey | 181/293 |
| 3,142,599 A | * | 7/1964 | Chavannes | 428/180 |
| 4,111,585 A | * | 9/1978 | Mascaro | 404/70 |
| 4,162,393 A | * | 7/1979 | Balboni | 219/217 |
| 4,222,695 A | * | 9/1980 | Sarides | 410/68 |
| 4,301,040 A | | 11/1981 | Berbeco | 252/511 |
| 4,715,743 A | * | 12/1987 | Schmanski | 404/9 |
| 4,756,941 A | | 7/1988 | McCullough et al. | 428/95 |
| 4,962,441 A | * | 10/1990 | Collins | 361/234 |
| 4,978,700 A | | 12/1990 | Haygood | 524/156 |
| 5,167,997 A | * | 12/1992 | Chamberlain | 428/76 |
| 5,173,351 A | * | 12/1992 | Ruppel et al. | 428/174 |
| 5,328,293 A | * | 7/1994 | Keefe | 404/9 |
| 5,525,411 A | | 6/1996 | Stewart et al. | 428/236 |
| 5,653,551 A | * | 8/1997 | Seaux | 404/35 |
| 6,154,956 A | * | 12/2000 | Frohardt | 29/825 |
| 6,199,335 B1 | * | 3/2001 | Brenot | 52/480 |
| 6,296,919 B1 | * | 10/2001 | Rockwell | 428/85 |
| 6,372,323 B1 | * | 4/2002 | Kobe et al. | 428/119 |
| 6,420,015 B1 | * | 7/2002 | Nord et al. | 428/172 |

FOREIGN PATENT DOCUMENTS

FR 0178241 * 9/1984 .......... E04F/15/04

* cited by examiner

Primary Examiner—Carl D. Friedman
Assistant Examiner—Chi Q. Nguyen
(74) Attorney, Agent, or Firm—Terry T. Moyer; Charlotte C. Wilson

(57) ABSTRACT

The present disclosure relates to an anti-fatigue flooring article having inherent properties of electrostatic dissipation. Further, this disclosure relates to flooring article having at least two layers, wherein a first layer (comprised of dense rubber) is calendered to a second layer (comprised of foam rubber). Each layer has a different electrical conductivity, thereby creating a mat having an appropriate range of conductivity when combined. The present flooring article may also include a layer of static dissipating scrim, a grounding means, and/or a colored marking.

9 Claims, 2 Drawing Sheets

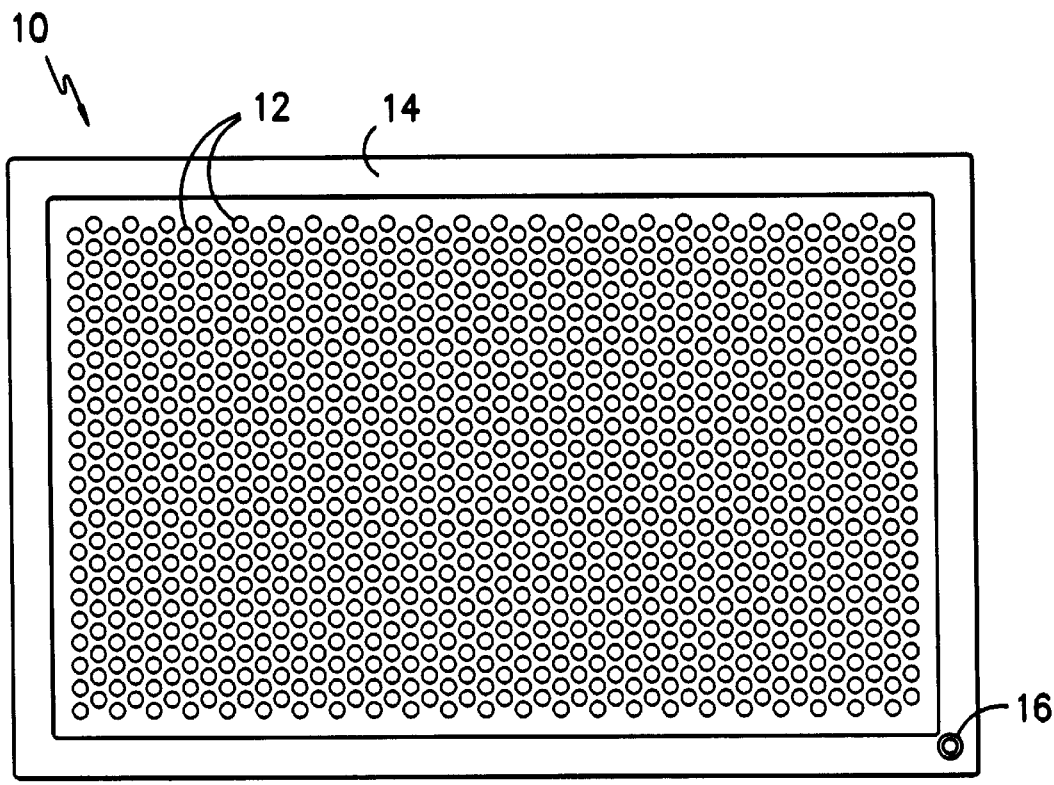
FIG. -1-
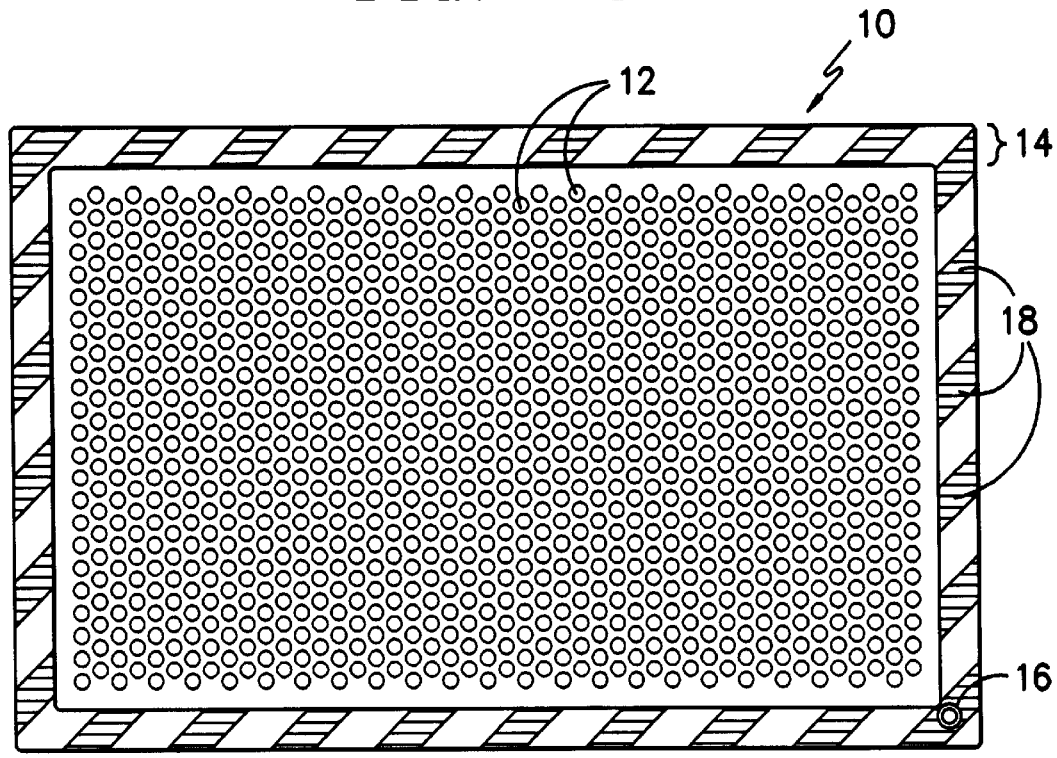
FIG. -2-

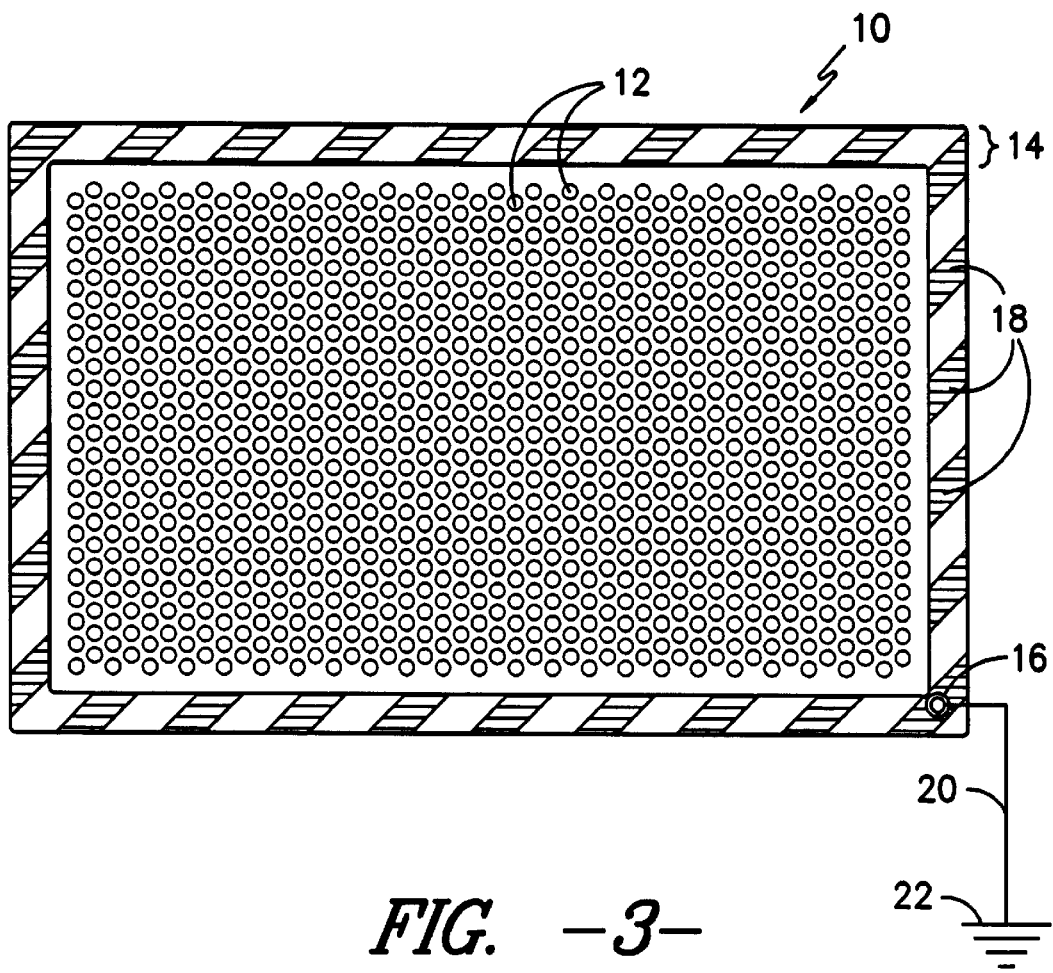
FIG. -3-
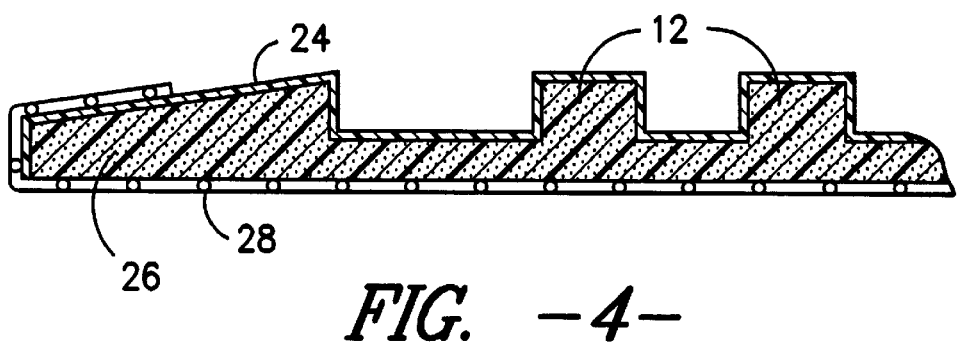
FIG. -4-
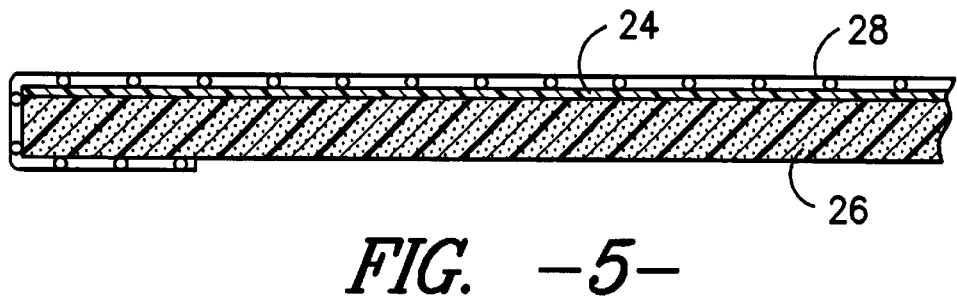
FIG. -5-

ELECTROSTATIC DISSIPATING FLOORING ARTICLE

TECHNICAL FIELD

The present disclosure relates to an anti-fatigue flooring article having inherent properties of electrostatic dissipation. Further, this disclosure relates to flooring article having at least two layers, wherein a first layer (comprised of dense rubber) is calendered to a second layer (comprised of foam rubber). Each layer has a different electrical conductivity, thereby creating a mat having an appropriate range of conductivity when combined. The present flooring article may also include a layer of static dissipating scrim, a grounding means, and/or a colored marking.

BACKGROUND

Static dissipating floor articles are useful in manufacturing locations and in areas where computers or other sensitive electronic equipment is used. The objective of such flooring articles is to reduce static electricity on a person when that person is performing job tasks related to the manufacture of textiles, electronic components, or other products. It is known that static electricity can be generated by rubbing articles together, such as fibers or plastic components. Static electricity can be accumulated on a person's body and be discharged when the person touches a metal or grounded object. Such discharge can be unpleasant or painful to the person and may result in damage to nearby electronic devices or computer-aided instruments. Thus, an ideal flooring article for this situation should provide static dissipating properties to reduce static associated with persons standing on the article and insulating properties to prevent the mat from conducting electricity to persons standing on the article.

SUMMARY

The present flooring article functions as a static dissipating article and may include a grounding means (such as a snap, grommet, or the like) to prevent a person standing on the article from being shocked. A layer of static dissipating scrim may also be incorporated onto the flooring article. Alternatively, the flooring article can function as an insulating mat and be inherently grounded for use on conductive flooring. A flooring article having an appropriate range of conductivity is described herein.

BRIEF DESCRIPTION OF DRAWINGS

FIG. 1 is a plan view of the face side of the static dissipating flooring article of the present invention, including a grounding means attached thereto;

FIG. 2 is a plan view of the face side of the static dissipating flooring article of the present invention, including a grounding means attached thereto and a border marking around the perimeter thereof;

FIG. 3 is a plan view of the static dissipating flooring article of the present invention, secured to a ground via a wire from the grounding means incorporated on the flooring article to the ground; and FIG. 4 is a cross-sectional view of the static dissipating flooring article of the present invention, further including an anti-static scrim that covers the lower surface of the article; and FIG. 5 is a cross-sectional schematic view of the static dissipating flooring article of the present invention, wherein the anti-static scrim covers the upper surface of the article.

DETAILED DESCRIPTION

As used herein, the term "flooring article" shall refer to a vulcanized rubber article that covers the floor but may be easily removed by the user. A flooring article is intended to encompass a mat (having a defined shape and integrated border area) and a flooring tile (a substantially square flooring article having cut edges rather than a molded and defined border).

FIG. 1 shows a plan view of the face side of one embodiment of the present flooring article. This is the side that would typically be seen by persons using article 10. The face side includes a plurality of protrusions 12 positioned in a patternwise arrangement across the surface. Article 10 also includes a border area 14 around the perimeter, in which a grounding means 16 may incorporated. Although shown as a mat-type flooring article, article 10 might also comprise a flooring tile (thus lacking border area 14).

The particular pattern of protrusions 12 is not critical to the performance characteristics of flooring article 10. Any spaced arrangement that provides a heightened surface may be used. More critical is the rubber formulation that is used. A dense rubber layer 24 is calendered to a foam rubber layer 26. A die mold or molding plate is placed over dense rubber layer 24, and foam rubber layer 26 is allowed to expand through a patternwise arrangement of openings. As the rubber is cured, foam layer 26 expands to create protrusions 12 that are "capped" by the dense rubber layer. The rubber formulation is a proprietary compound, sold under the name HM-8 from Hoover Hanes Custom Rubber Mixing Corporation, a subsidiary of RBX of Roanoke, Va. It contains from 20 parts to 70 parts by weight carbon black particles in both layers, which enhance the static dissipating qualities of article 10.

Resultant flooring article 10 comprises unique features. First, protrusions 12, in combination with the formulation used, produce a mat having desirable anti-fatigue qualities. Cumulative Standing Trauma (CST) is the result of excessive stress on the back, legs, and various muscles of a person who stands for long periods of time. CST can lead to varicose veins and to arch and heel pain from flattened feet. Flooring article 10 combats these problems. Persons standing for long periods of time on such a flooring article 10 (as described herein) are less likely to suffer from CST and other muscular disorders than those standing on concrete or other flooring surfaces.

More importantly, article 10, because of its conductivity level, is capable of dissipating electrostatic charges from persons standing thereon. This conductivity is important in dissipating charges created in manufacturing locations, clean rooms, and areas where sensitive electronic equipment is in use. Electrical resistance is the property of a material whereby it opposes the flow of an electric current. Electrical resistance is measured in ohms ($\Omega$); one such test for measuring electrical resistance is ASTM F-150. A range of values from that test is shown in Table 1, along with the affiliated industry nomenclature.

TABLE 1

Industry Nomenclature for Electrical Conductivity of Floor Coverings

| Classification | Electrical Resistance range (Ohms) ASTM F-150 |
|---|---|
| Insulative | $1 \times 10^{13}$–$1 \times 10^{15}$ |
| Static Dissipative | $1 \times 10^{6}$–$1 \times 10^{11}$ |

TABLE 1-continued

Industry Nomenclature for Electrical Conductivity of Floor Coverings

| Classification | Electrical Resistance range (Ohms) ASTM F-150 |
|---|---|
| Conductive | $2.54 \times 10^4 - 1 \times 10^6$ |
| Super Conductive | $1 \times 10^1 - 1 \times 10^4$ |

Founded in 1982, the Electrostatic Discharge (ESD) Association is a professional voluntary association dedicated to advancing the theory and practice of electrostatic discharge (ESD) avoidance. From fewer than 100 members, the Association has grown to more than 2,000 members throughout the world. From an initial emphasis on the effects of ESD on electronic components, the Association has broadened its horizons to include areas such as textiles, plastics, web processing, explosives, clean rooms, and graphic arts. To meet the needs of a continually changing environment, the Association is chartered to expand ESD awareness through standards development, educational programs, local chapters, publications, tutorials, certification, and symposia. Their mailing address is 7900 Turin Road, Bldg. 3, Suite 2, Rome, N.Y. 13440-2069, and their web-site is www.esda.org.

Tests, conducted according to the ESD Association's Test Method S7.1, of two embodiments of article 10 are documented in Table 2. Samples 1 and 2 were comprised of a dense rubber layer and a foam rubber layer, in which each layer contained between 20 and 70 parts by weight of carbon black particles.

TABLE 2

Resistance ESD 7.1
RESISTANCE ESD 7.1
100 Volts, 72° F., 50% Relative Humidity - Measured in Ohms (Ω)

|  | Point to Point | Surface to Ground (Al foil underneath) |
|---|---|---|
| Dense Rubber Layer - Sample 1 | $1.43 \times 10^6$ | $1.04 \times 10^6$ |
| Foam Rubber Layer - Sample 1 | $1.08 \times 10^9$ | $1.09 \times 10^9$ |
| Dense Rubber Layer - Sample 2 | $1.06 \times 10^6$ | $1.00 \times 10^6$ |
| Foam Rubber Layer - Sample 2 | $2.73 \times 10^9$ | $2.40 \times 10^9$ |

The above table indicates that dense rubber layer 24 is more conductive than foam rubber layer 26. The combination of rubber layers and the resulting combination of conductivity levels make article 10 well-suited for static dissipation. When comparing the values from Table 2 with the industry definitions listed in Table 1, it is clear that article 10 falls within the definition of "static dissipative."

Turning again to the drawings, FIG. 2 shows border area 14 on which a distinctive colored marking 18 may be included. Marking 18 may consist of a solid color different from that of article 10 or any geometric or organic pattern, including, but not limited to, stripes of varying widths, designs, or logos. In one embodiment, marking 18 approximates the dimensions of border area 14, in order to differentiate article 10 from other mats that may be in use in a given facility. Royal blue is one example of a color accepted by the industry for such marking, although other colors may be equally acceptable to other industry groups or countries.

Marking 18 may be comprised of thermoplastic elastomer (TPE), thermoset rubber, vinyl, polyvinyl chloride (PVC), thermoplastic olefins, or any other colored sheet that will permanently laminate to the rubber during the vulcanization process. PVC must be thermoprinted onto article 10 and is currently available only in white. The preferred material is TPE, such as is available in a variety of colors and thicknesses from Specialty Adhesive Film of Cleves, Ohio. A suitable thickness of colored material used for marking 18 is in the range of 3 to 200 mils (1 mil=0.001 inches). The colored material can be cut by any cutting means appropriate for the application; for instance, if a precision cut is required, a cutting means capable of precision is required. Any cutting means known in the industry, including, but without limitation, an X-Y plotter, a rotary die cutter, or any other die cutters, may be used.

To laminate the colored material used in marking 18 to flooring article 10, the material is placed on top of the uncured rubber. The colored material may be laminated to either the dense rubber or foam rubber side of article 10. A die mold (such as has been previously described) is positioned over the layers. The rubber is vulcanized to create flooring article 10, to which marking 18 is then permanently laminated. Multiple layers of colored material may be used. These colored layers can be laminated one upon the other or in registration with each other to create multi-color sheeting, graphics, patterns, or the like. Graphics, logos, geometries, diagonal stripes of varying widths, and/or alphanumeric figures can each be produced using this lamination technique. Marking 18 may be applied to border area 14 or, in an alternate embodiment, at any position in the center panel of article 10. If marking 18 is applied to the center of mat 10 (that is, in an area in which protrusions 12 will be created), then marking 18 will become attached to the tops and sides of protrusions 12.

By using the lamination technique described herein, flooring articles 10 are given a distinctive appearance with less cost than would be associated with colored rubber. First, the colored material (e.g., TPE) provides the same colored effect as a co-calendered colored rubber, with a much thinner film and much less weight. Accordingly, the thinner film needs a shorter cure time, contributing to a decrease in manufacturing costs. Unlike rubber, which tends to cure over time even in inventory at room temperature, TPE is already cured and therefore does not have a limited shelf-life.

Turning now to FIG. 3, grounding means 16 is comprised of a snap, grommet, probe, or other conductive device to which a ground wire may be connected. Although shown as a snap or grommet, grounding means 16 could consist of a wire protruding from the edge of article 10, a flat metal blade inserted through the edge of article 10, or any other grounding means known in the industry. Both the wire and the blade-style grounding means would be attached to a ground wire 20 that connects article 10 with a ground 22.

FIG. 4 shows a cross-sectional view of article 10, further including a layer of static-dissipating scrim 28. Scrim 28, comprised of conductive fibers configured in a substantially open construction, provides a conductive path from the upper surface of article 10 (that is, dense rubber layer 24) to the ground. Scrim 28 is laminated to article 10 during the vulcanization process, in such a way as to complete a circuit between article 10 and the ground. In a preferred embodiment, scrim 28 is laminated over the rear side of article 10 and onto border area 14 located on the face side of article 10. The vulcanization process protects scrim 28 while article 10 is in use and prevents scrim 28 from being damaged in multiple washings.

An alternate embodiment is shown in FIG. 5, in which scrim 28 is attached to dense rubber layer 24 that comprises the face layer of article 10. Scrim 24 is then wrapped around the edge portion(s) of article 10 to complete the circuit between article 10 and the ground.

Alternatively, scrim 28 can be integrated between the dense rubber layer and the foam rubber layer during calendering and prior to vulcanization, if scrim 28 is allowed to wrap around foam layer 26. Wherever it is positioned, scrim 28 must make good electrical contact with the rubber components of article 10.

What is claimed is:

1. A flooring article having electrostatic dissipative properties, said article comprising at least two layers and a layer of static dissipating scrim attached to said layers, a first of the two layers being comprised of dense rubber and a second of the two layers being comprised of foam rubber, wherein a plurality of protrusions extend vertically from said first layer, each of said protrusions having a core portion and an outside surface portion, said core being comprised of foam rubber and said outside surface portion being comprised of dense rubber, and wherein said scrim has a substantially open construction.

2. The flooring article of claim 1 wherein said scrim is comprised of conductive fibers.

3. The flooring article of claim 1 wherein said scrim is positioned to cover substantially all of said dense rubber layer and to cover at least part of the perimeter portion of said foam rubber layer.

4. The flooring article of claim 1 wherein said scrim is positioned to cover substantially all of said foam rubber layer and to cover at least part of the perimeter portion of said dense rubber layer.

5. The flooring article of claim 1 wherein a colored marking is laminated to said flooring article, said colored marking being comprised of thermoplastic elastomer, thermoplastic olefins, thermoset rubber, vinyl, polyvinyl chloride, or other colored film.

6. The flooring article of claim 5 wherein said colored marking is used to create any of logos, graphics, stripes, and geometric or organic patterns.

7. The flooring article of claim 5 wherein said colored marking has a thickness in the range of 3 mils to 200 mils.

8. The flooring article of claim 7, wherein said colored marking is comprised of thermoplastic elastomer.

9. The flooring article of claim 1, further comprising a grounding means attached thereto, said grounding means being selected from the group consisting of a snap, a grommet, a wire, a probe, and a flat metal blade.

* * * * *